US007729700B2

(12) United States Patent
Alemany et al.

(10) Patent No.: US 7,729,700 B2
(45) Date of Patent: Jun. 1, 2010

(54) VERTICAL NETWORK HANDOVERS

(75) Inventors: Juan Alemany, Sunnyvale, CA (US); Thane Frivold, Redwood City, CA (US); Andy Kelm, San Carlos, CA (US); Darren Lancaster, Campbell, CA (US)

(73) Assignee: Nokia Corporation, Espoo (FI)

( * ) Notice: Subject to any disclaimer, the term of this patent is extended or adjusted under 35 U.S.C. 154(b) by 1599 days.

(21) Appl. No.: 10/862,769

(22) Filed: Jun. 7, 2004

(65) Prior Publication Data

US 2005/0271011 A1    Dec. 8, 2005

(51) Int. Cl.
*H04W 36/00* (2009.01)
(52) U.S. Cl. ...................... 455/436; 455/415
(58) Field of Classification Search .............. 455/436, 455/439, 442, 41.2, 550.1, 551, 561
See application file for complete search history.

(56) References Cited

U.S. PATENT DOCUMENTS

| 6,680,923 | B1 | 1/2004 | Leon |
| 2002/0031108 | A1 | 3/2002 | Inoue |
| 2002/0085516 | A1* | 7/2002 | Bridgelall .................. 370/329 |
| 2004/0199649 | A1* | 10/2004 | Tarnanen et al. ............ 709/230 |
| 2005/0239498 | A1* | 10/2005 | Dorenbosch et al. ..... 455/552.1 |
| 2005/0271018 | A1* | 12/2005 | Liu et al. .................... 370/338 |

OTHER PUBLICATIONS

Press Release (Schaumburg, IL and Dallas. Jun. 17, 2003. "Motorola Adds Texas Instruments OMAP Processor for Voice Over IP Wireless LAN Capabilities." Available: http://www.motorolo.com/mediacenter/news/detailpf/0,,2934_2394_23,00.html. 2pp.
"VoIP Protocols—Including MGCP Media Gateway Countol Protocol#SIP#SIP#SIP#SI." Nd. Available: http://www.protocols.com/pbook/VolPFamily.htm. 5pp.
Simon, Ellen. Associated Press. May 10, 2004. "Wi-Fi nets redefining how we use telephones." *The Seattle Times: Business*. 1pg.

* cited by examiner

*Primary Examiner*—Tu X Nguyen
(74) *Attorney, Agent, or Firm*—Harrington & Smith

(57) ABSTRACT

Establishing and controlling communication to and from a mobile terminal with multiple network interfaces that can be reached with one phone number via multiple networks. The mobile terminal simultaneously communicates with a central server over a cellular network and a WLAN to dynamically coordinate a preferred routing of a communication session with a partner node. The communication session is routed over whichever network is optimal at any given time, depending on a current location of the mobile device, current performance of each network, and other criteria. A new communication session is established through the central server to enable one number access to and from the mobile terminal. An ongoing communication session is continuously monitored to determine whether and when to perform a network handover. The mobile terminal obtains performance data regarding each network and arranges a network handover with the central server.

19 Claims, 7 Drawing Sheets

VERTICAL NETWORK HANDOVERS

FIELD OF THE INVENTION

The present invention is directed to dynamic vertical network handovers between multiple networks, and more specifically to controlling routing of a communication session between a communication node and a mobile terminal with a capability to participate in multiple communication sessions via one or more communication networks.

BACKGROUND OF THE INVENTION

Communication in an enterprise is often cumbersome, because users typically have desk phones and mobile phone terminals with multiple phone numbers and multiple messaging systems. This situation arises in most enterprises, which generally do not have mobile network coverage in their offices. Consequently, enterprise users often use two different phones: one for outside the office and one for in the office. Enterprise users therefore have to deal with multiple phone numbers and devices depending on location, and corresponding voicemail and messaging systems associated with the various devices and systems. As workers and other organizational members become increasingly mobile, enterprises need solutions to make communications more effective, reliable and mobile.

Some enterprises have attempted to use a voice over wireless local area network (VoWLAN) to provide some mobile communication within the enterprise facilities. However, most VoWLAN implementations provide a relatively low degree of reliability, to which most users are not accustomed relative to wired telephone systems (e.g., 99.999% reliability for voice calls). In the past, for an existing VoWLAN to have a better degree of reliability, the VoWLAN was very dense and thoroughly tested, which made the VoWLAN more costly to build. Also, existing VoWLANs typically require many access points to provide mobility within an enterprise, because of the relatively limited range of WLAN communications. Further, the bandwidth of a VoWLAN is subject to variable loads from computing devices and other mobile terminals. For example, if a computing device transferred a relatively large file during a VoWLAN call, a delay in the voice call could be caused.

Currently, there is are relatively meager fail-over mechanisms for VoWLAN networks to switch to an alternate network if the wireless local area network (WLAN) becomes unsuitable for voice communication with a mobile terminal. Moreover, current VoWLAN and voice over Internet protocol (VoIP) solutions have difficulty with live session handovers between mobile networks and WLANs. Mobile terminals typically have one type of wireless communication interface, or are restricted to completing a session on the network that it was initiated. Consequently, enterprise members typically have separate wired and wireless phones with associated voicemail systems to make the enterprise members more reachable.

DETAILED DESCRIPTION OF THE INVENTION

An embodiment is described in terms of a mobile terminal that has an ability to interface with multiple networks, including multiple types of networks. This exemplary embodiment is designed to allow enterprise members to carry a single terminal that is accessible with a single phone number. When the member is on the enterprise premises, the mobile terminal preferably connects via a local wireless connection. However, when local wireless coverage is not available, the mobile terminal connects via a wide area mobile wireless network (e.g., a cellular network). In general, the invention leverages the reliability and coverage of the existing public switched telephone network (PSTN) and existing wide area mobile networks, while bringing the cost savings of IP-based communications. Accordingly, the exemplary embodiment describes a mechanism for "vertical handovers" between the wide area mobile network and the local area network. The ability to dynamically handover an ongoing communication session between the local enterprise network and the wide area mobile wireless network allows the user to maintain a call while wandering between networks. The following embodiment utilizes the session-based initiation protocol (SIP) to enable reliable multimedia services to mobile terminals. However, other protocols can be used.

Figure 1:
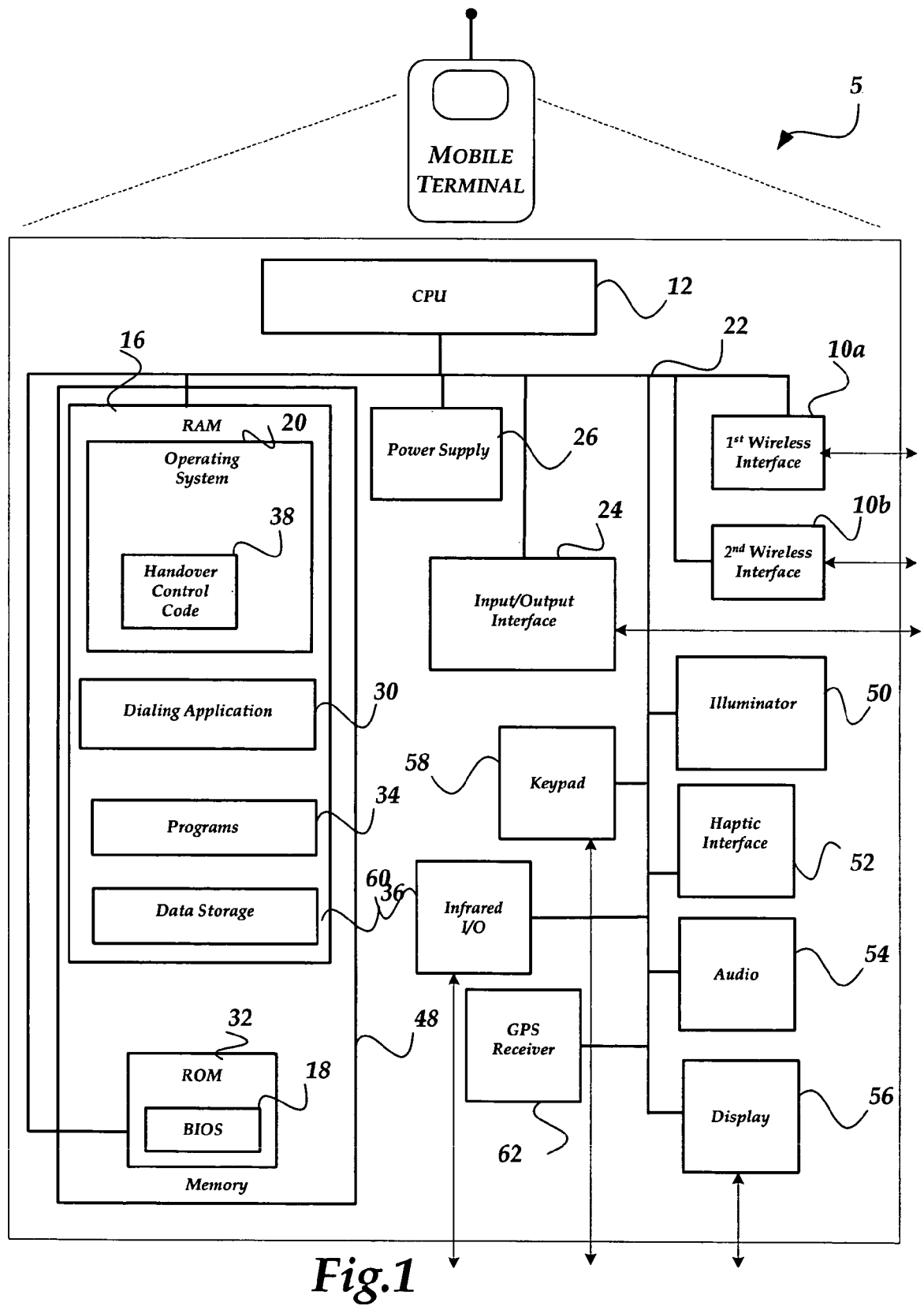
FIG. 1 is a schematic diagram that illustrates components that can be included in a mobile terminal.

FIG. 1 shows an exemplary mobile terminal 5, according to one embodiment of the invention. In one embodiment, mobile terminal 5 is a cellular telephone that is arranged to send and receive voice communications and messages such as Short Messaging Service (SMS) messages via multiple wireless communication interfaces. Generally, mobile terminal 5 may comprise any device capable of simultaneously connecting to two or more wireless networks, simultaneously connecting to multiple nodes of a single wireless network, simultaneously communicating over multiple channels to one or more networks, or otherwise simultaneously engaging in multiple communication sessions. Such devices include dual communication cellular telephones, smart phones, pagers, radio frequency (RF) devices, infrared (IR) devices, integrated devices combining one or more of the preceding devices, and the like. Mobile terminal 5 may also comprise other wireless interface devices that such as Personal Digital Assistants (PDAs), handheld computers, personal computers, multiprocessor systems, microprocessor-based or programmable consumer electronics, network PCs, wearable computers, and the like.

Figure 2:
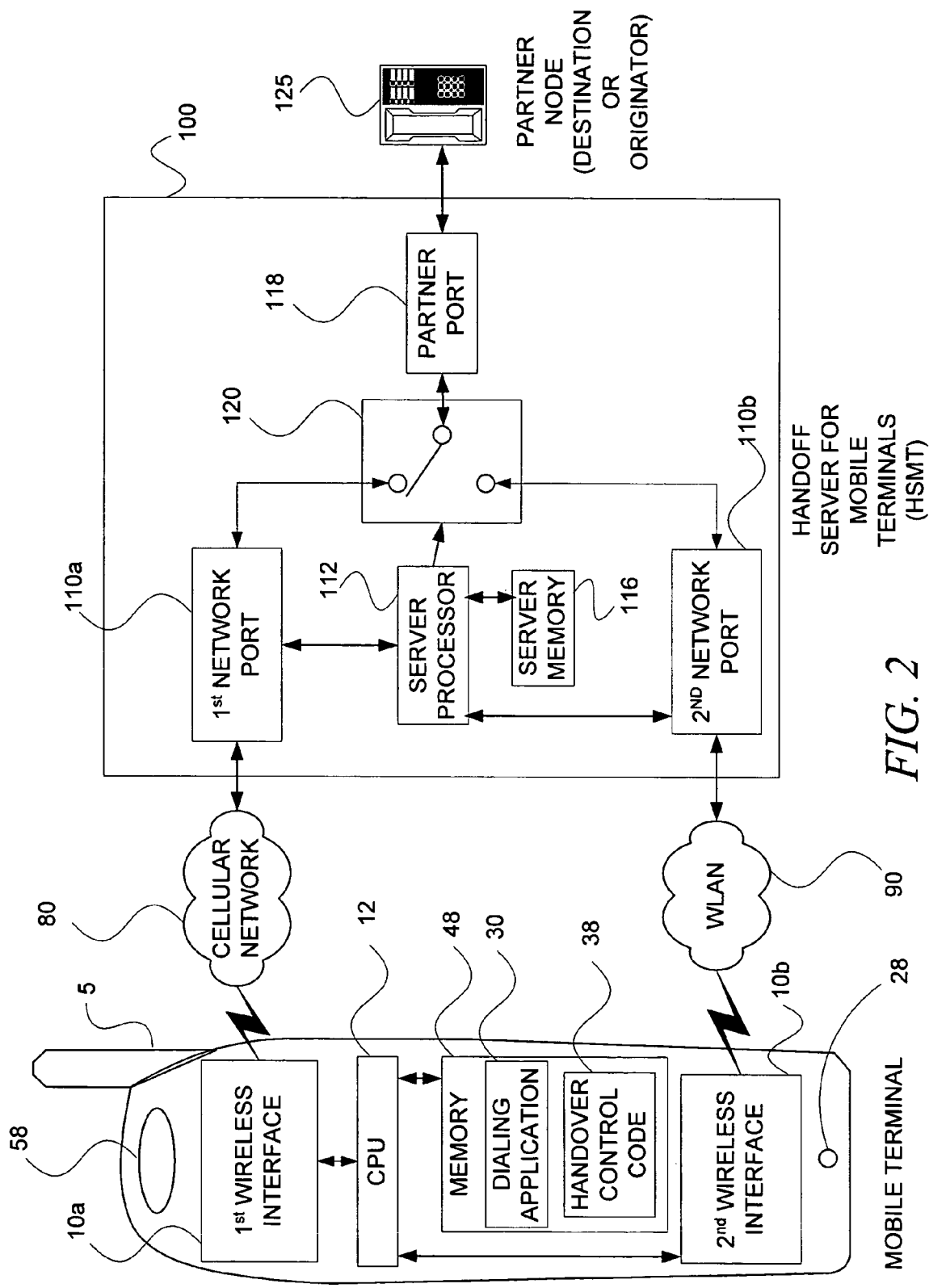
FIG. 2 is a functional block diagram illustrating a configuration of functional elements for an exemplary embodiment of the invention.

Mobile terminal 5 may include many more components than those shown in FIG. 2. However, the components shown are sufficient to disclose an illustrative embodiment for practicing the present invention. As shown in the figure, mobile terminal 5 includes a processing unit 12, a memory 48, a RAM 16, a ROM 32, an operating system 20, a dialing application 30, programs 34, a data storage 36, a bios 18, a power source 26, an input/output interface 24, a first wireless interface 10a, a second wireless interface 10b, an illuminator 50, a haptic interface 52, an audio interface 54, a display 56, a keypad 58, an infrared input/output interface 60, and a global positioning systems (GPS) receiver 62.

Mobile terminal 5 may optionally communicate with a base station (not shown), or directly with another mobile device, via first or second wireless interfaces 10a and 10b. Wireless interfaces 10a and 10b include circuitry for coupling mobile terminal 5 to various wireless networks, and are constructed for use with various communication protocols and technologies including, but not limited to, user datagram protocol (UDP), transmission control protocol/Internet protocol (TCP/IP), SMS, general packet radio service (GPRS), Wireless Application Protocol (WAP), ultra wide band (UWB), IEEE 802.16 Worldwide Interoperability for Microwave Access (WiMax), and the like.

Mass memory 48 generally includes RAM 16, ROM 32, and one or more data storage units 36. Mass memory 48 as described above illustrates a type of computer-readable media, namely computer storage media. Computer storage media may include volatile and nonvolatile, removable and non-removable media implemented in any method or technology for storage of information such as computer readable instructions, data structures, program modules or other data. Examples of computer storage media include RAM, ROM, EEPROM, flash memory or other semiconductor memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device. Data storage 36 can be utilized by mobile terminal 5 to store, among other things, programs 34, dialing application 30, databases and/or libraries of images, lists and other data.

The mass memory stores operating system 20 for controlling the operation of mobile terminal 5. It will be appreciated that this component may include a general purpose operating system such as a version of UNIX or LINUX™, or a specialized mobile communication operating system such as the Symbian® operating system. The operating system preferably includes a module of handover control code 38 for determining whether and/or when to reroute a communication session from one network to a different network, as discussed in detail below. Basic input/output system ("BIOS") 18 is also provided for controlling the low-level operation of mobile terminal 5. The mass memory further stores application code and data used by mobile terminal 5. More specifically, mass memory 48 stores dialing application 30, and programs 34. Dialing application 30 may include computer executable instructions, which may be run under control of operating system 20 to control initiation of outgoing calls. Also, programs 34 may include computer executable instructions which, when executed by mobile terminal 5, transmit and receive WWW pages, e-mail, audio, video, and enable telecommunication with another user of another mobile device.

Mobile terminal 5 also comprises input/output interface 24 for communicating with external devices, such as a headset, or other input or output devices not shown in FIG. 2. Keypad 58 may comprise any input device arranged to receive input from a user. For example, keypad 58 may include a push button numeric dial, or a keyboard. Keypad 58 may also include command buttons that are associated with selecting and sending images. Display 56 may be a liquid crystal display (LCD), gas plasma, light emitting diode (LED), or any other type of display used with a mobile device. Display 56 may also include a touch sensitive screen arranged to receive input from an object such as a stylus or a digit from a human hand. Additionally, infrared input/output 60 may be used to send and receive infrared commands to/from other devices.

Power supply 26 provides power to mobile terminal 5. A rechargeable or non-rechargeable battery may be used to provide power. The power may also be provided by an external power source, such as an AC adapter or a powered docking cradle that supplements and/or recharges a battery.

As shown, mobile terminal 5 includes illuminator 50, haptic interface 52, and audio interface 54. Illuminator 50 may remain active for specific periods of time or in response to events. For example, when illuminator 50 is active, it may backlight the buttons on keypad 59 and stay on while the mobile device is powered. Also, illuminator 50 may backlight these buttons in various patterns when particular actions are performed, such as dialing another mobile device. Illuminator 50 may also cause light sources positioned within a transparent or translucent case of the mobile device to illuminate in response to actions. Haptic interface 52 is arranged to provide tactile feedback to a user of the mobile terminal. For example, the haptic interface may be employed to vibrate mobile terminal 5 in a particular way when another user of a mobile device is calling. Audio interface 54 is arranged to produce and receive audio signals such as the sound of a human voice. For example, audio interface 54 may be coupled to a speaker and microphone (not shown) to enable telecommunication with others and/or generate an audio acknowledgement for some action.

GPS receiver 62 can determine the physical coordinates of mobile terminal 5 on the surface of the Earth, which can be presented to a geographical address program in longitude and latitude coordinates. These coordinates can include latitude, longitude and altitude. GPS is operated by the United States Department of Defense to provide worldwide navigation, position location, and precision timing services. GPS comprises a global network of satellites that interact with GPS receiver 62, allowing the geographical address application to precisely determine the location of mobile terminal 5. This location is typically output from GPS receiver 62 as latitude and longitude values. GPS receiver 62 can also employ other geo-positioning mechanisms, including, but not limited to, triangulation, assisted GPS (AGPS), E-OTD, CI, SAI, ETA, BSS and the like, to further determine the physical location of mobile terminal 5 on the surface of the Earth. It is understood that under different conditions, GPS receiver 62 can determine a physical location within millimeters for mobile terminal 5; and in other cases, the determined physical location may be less precise, such as within a meter or significantly greater distances.

FIG. 2 is a functional block diagram illustrating a configuration of functional elements for an exemplary embodiment of the invention. Mobile terminal 5 is in communication with a handoff server for mobile terminals (HSMT) 100, which regulates communication with a partner node 125. Mobile terminal 5 is illustrated with those functional components that are relevant to routing communication sessions according to the present invention. Relevant functional components include CPU 12 which is in communication with memory 48, first wireless interface 10a, and second wireless interface 10b. As indicated above, memory 48 includes machine instructions that cause CPU 12 to perform the functions defined in dialing application 30 and handover control code 38. Mobile terminal 5 also includes a microphone 28 for detecting sound input and a speaker 58 for producing an audible sound output.

First wireless interface 10a can comprise a radio, such as a cellular radio transceiver, for wireless communication with a cellular network 80. Similarly, second wireless interface 10*b* can comprise a second radio for communication with a WLAN 90. First wireless interface 10*a* and second wireless interface 10*b* can comprise the same kind of device and/or can be combined into a single device. The wireless interfaces can provide single channel or multi channel communication. If using a single device, frequency division, time division, and other techniques can be used to alternate communication with multiple wireless networks such as cellular network 80 and WLAN 90, or to carry on two communication sessions with a single wireless network.

Each of the wireless networks is in communication with a network interface of HSMT 100. For example, cellular network 80 communicates with a first network port 110*a*, and WLAN 90 communicates with a second network port 110*b*. Each network port employs protocols appropriate for communicating with the corresponding wireless network. For instance, first network port 110*a* can utilize the session-based initiation protocol to act as a SIP port into HSMT 100. A standard Internet protocol can be used by second network port 110*b* to provide an IP port for WLAN 90. HSMT 100 can maintain simultaneous communication with mobile terminal 5 via the network ports to the wireless networks.

A server processor 112 executes machine instructions stored in a server memory 116 to coordinate communication through the network interfaces. Server processor 112 also controls a functional switch 120 to route communication between mobile terminal 5 and partner node 125 via one of the wireless networks. Accordingly, HSMT 100 includes a partner port 118 that provides a communication interface with partner node 125. The switching function can be implemented with a SIP back-to-back user agent (B2BUA) and/or similar functional module.

Figure 3:
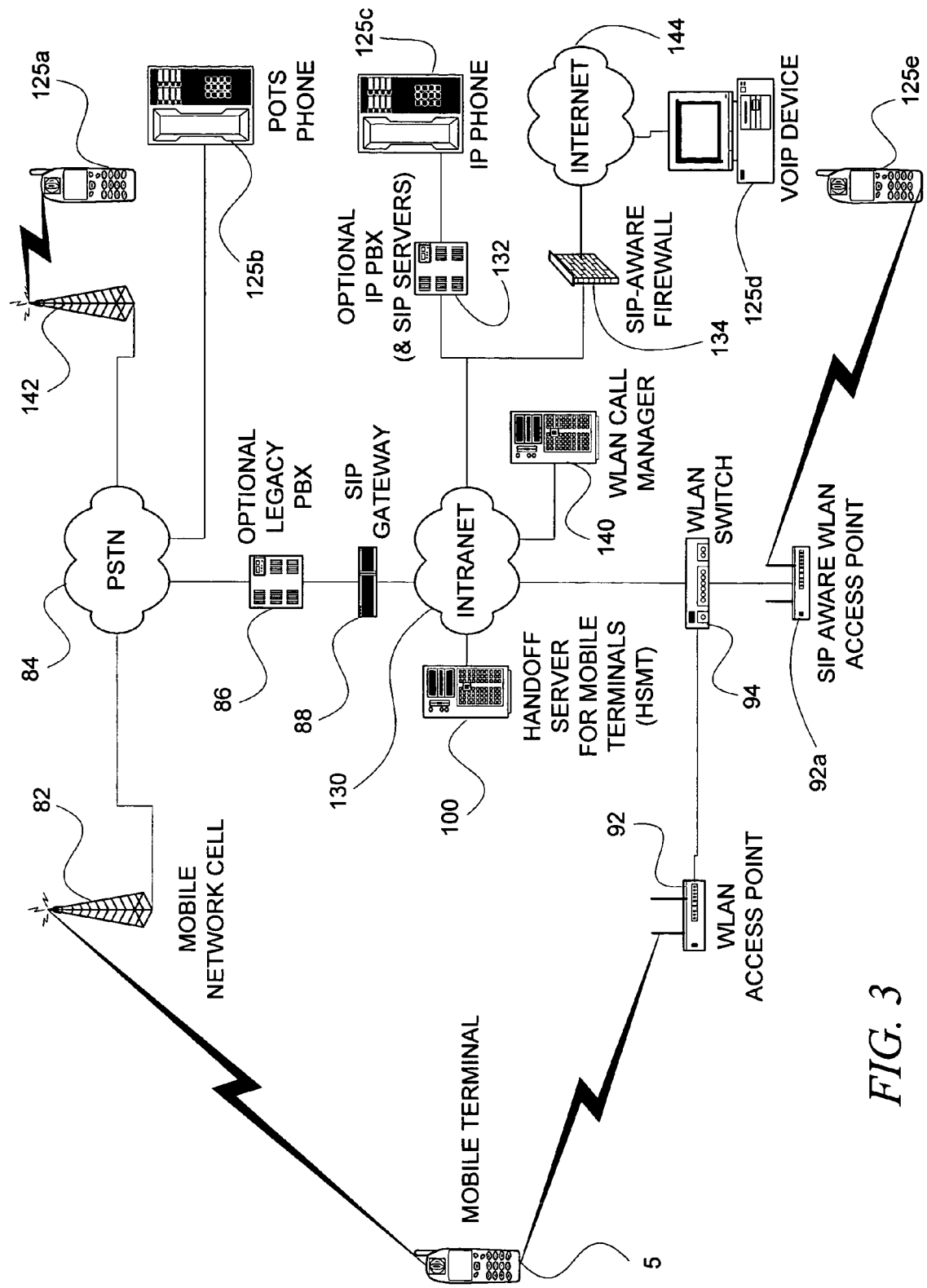
FIG. 3 is an architectural overview diagram illustrating an exemplary enterprise communication system embodying the present invention.

FIG. 3 is an architectural overview diagram illustrating an exemplary enterprise communication system. As indicated above, mobile terminal 5 enables a mobile user to communicate through one wireless network and the HSMT to another user, while simultaneously communicating with the HSMT via another wireless network. In this exemplary enterprise communication system, the HSMT is controlled by the enterprise. However, the HSMT can be controlled by a public network operator. In an enterprise communication system, mobile terminal 5 can communicate with a mobile network cell 82 when outside of the enterprise facilities, or when cellular communication is more reliable than WLAN communication. Communication with mobile network cell 82 is relayed through public switched telephone network (PSTN) 84, and into the enterprise facilities through an optional legacy private branch exchange (PBX) 86 and a SIP gateway 88. The communication then travels through an enterprise intranet 130 to HSMT 100. Many of the network components can be combined or configured differently. For example, the HSMT can be incorporated into the SIP gateway or vice versa. In any case, if the communication is voice communication and HSMT 100 is set to route the voice communication to a partner node, the voice communion is relayed back out through intranet 130 to the desired partner node. For example, the voice communication can be routed back out through SIP gateway 88 and optional legacy PBX 86 to PSTN 84, where the voice communication can be routed to another mobile network cell 142, reaching a desired mobile partner node 125*a*. Similarly, the voice communication can be routed through PSTN 84 to reach a user of a conventional plain old telephone service (POTS) partner node 125*b*. Alternatively, the voice communication can be routed through other conventional network systems such as an optional IP PBX 132 to reach an IP partner node 125*c*. Anther option includes routing the voice communication through a SIP-aware firewall 134 and through Internet 144 to a voice over Internet protocol (VoIP) partner node 125*d*. The voice communication can further be routed to another mobile partner node 125*e* via a WLAN described in further detail below.

An enterprise WLAN can be used when mobile terminal 5 comes within range of a WLAN access point 92. WLAN access point 92 supports one or more wireless communication protocols and/or local communication techniques such as IEEE 802.11, IEEE 802.16, Bluetooth, infrared communication, and the like. Communications through WLAN access point 92 are routed through a WLAN switch 94 and enterprise intranet 130 to HSMT 100. While within range of WLAN access point 92, mobile terminal 5 can communicate with HSMT 100 over both the cellular network and the WLAN, simultaneously. One wireless network can be used to transmit and receive voice communication, while the other wireless network can be used to transmit and receive data communication. A WLAN call manager 140 can monitor both communication routes, and provide network performance statistics that can be relayed back to mobile terminal 5 over the wireless network that is being used for data communication. The network performance statistics can be used by mobile terminal 5 and/or HSMT 100 to determine whether to transfer voice communication from one wireless network to the other wireless network. For example, while mobile terminal 5 is within the enterprise facility, it may be more economical for voice communication to be carried over the WLAN instead of a cellular network. Alternatively, if WLAN access point 92 becomes overloaded, voice communication can be rerouted through the cellular network. In one embodiment, mobile terminal 5 determines the best routing with the handover control code discussed above. However, HSMT 100 can make the determination in another embodiment. As also indicated above, multiple instances of the same type of wireless network can be used for dual communication. For example, mobile terminal 5 can communicate with another access point, such as a SIP aware WLAN access point 92*a*, to determine whether to transfer voice and/or data communication to the access point that is least loaded, closer in range, and/or otherwise more desirable.

Figure 4:
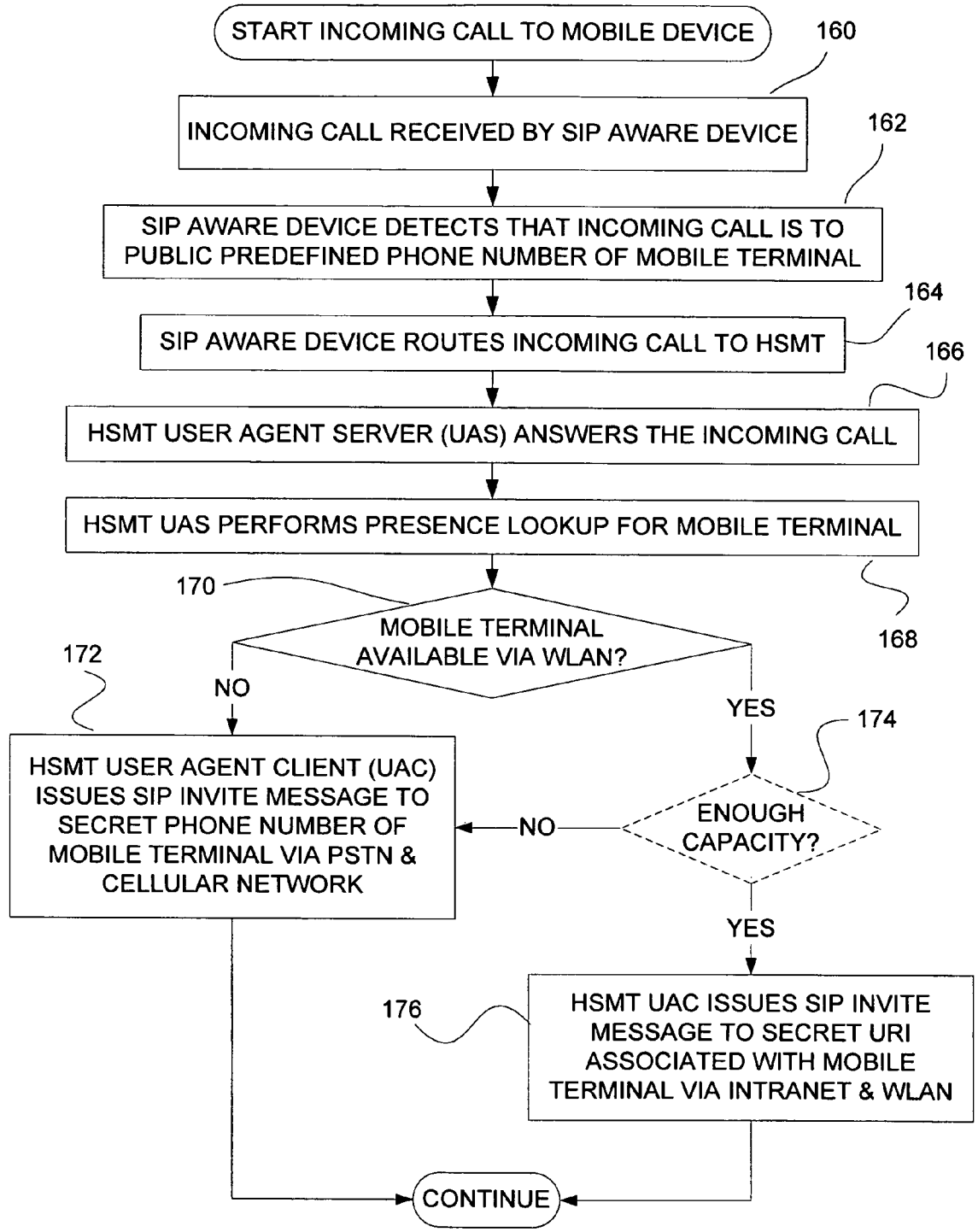
FIG. 4 is a flow diagram illustrating exemplary logic for routing an incoming call to the mobile terminal.

FIGS. 4-8 provide further detail of processing operations involved in various aspects of the communications discussed above. FIG. 4 is a flow diagram illustrating exemplary logic for routing an incoming call to the mobile terminal. At an operation 160, an incoming call is received from a partner node by a SIP aware device such as the SIP gateway. The SIP aware device detects that the incoming call is directed to a predefined public phone number of the mobile terminal, at an operation 162. This predefined public phone number is the phone number employed by a partner node to contact the mobile terminal, regardless of whether that contact is made via the cellular network or via the WLAN. At an operation 164, the SIP aware device routes the income call to the HSMT, which acts as a central server to switch the communication between the two wireless network links.

An HSMT user agent server (UAS) answers the incoming call at an operation 166 to establish an initial leg of communication between the caller and the enterprise. At an operation 168, the HSMT UAS performs a presence lookup to determine whether the mobile terminal is within range of a WLAN access point that is networked to the HSMT. At a decision operation 170, the HSMT determines whether the mobile terminal is available via an access point of the WLAN. This determination can be performed by attempting to access a predefined uniform resource identifier (URI), which is assigned to the mobile terminal, to see if the mobile terminal is currently registered with a WLAN access point. If the URI is not currently registered with any access point, a HSMT user agent client (UAC) issues a SIP invitation message (e.g., a SIP INVITE) to a secret cellular phone number of the mobile terminal, at an operation 172. The SIP invitation message is sent via the PSTN and cellular network. The secret cellular phone number corresponds to the mobile terminal, but is not publicly known. By not publishing the secret cellular phone number, the mobile terminal is not directly accessible. Instead, communication goes through the HSMT of the enterprise. If the HSMT UAC successfully connects with the mobile terminal, the incoming call is successfully routed through the HSMT to the mobile terminal via the cellular network.

Conversely, if the mobile terminal is available via a WLAN access point, the HSMT optionally determines, at a decision operation 174, whether sufficient capacity is available via the WLAN to support voice communication with the mobile terminal. If the WLAN capacity is not currently sufficient, the HSMT instead sends the SIP invitation message via the cellular network as described with regard to step 172. However, if the WLAN currently has sufficient capacity, the HSMT UAC issues the SIP invitation message to the URI of the mobile terminal, at an operation 176. Similar to the secret cellular phone number, the URI is preferably a secret URI, so that the HSMT can maintain control of communication with the mobile terminal via the WLAN. Other network performance characteristics can be evaluated prior to completing connection of the incoming call. In addition, if an attempt to route the income call via the WLAN is unsuccessful, the HSMT can try routing the incoming call via the cellular network, or send the incoming call to a voicemail system.

Figure 5:
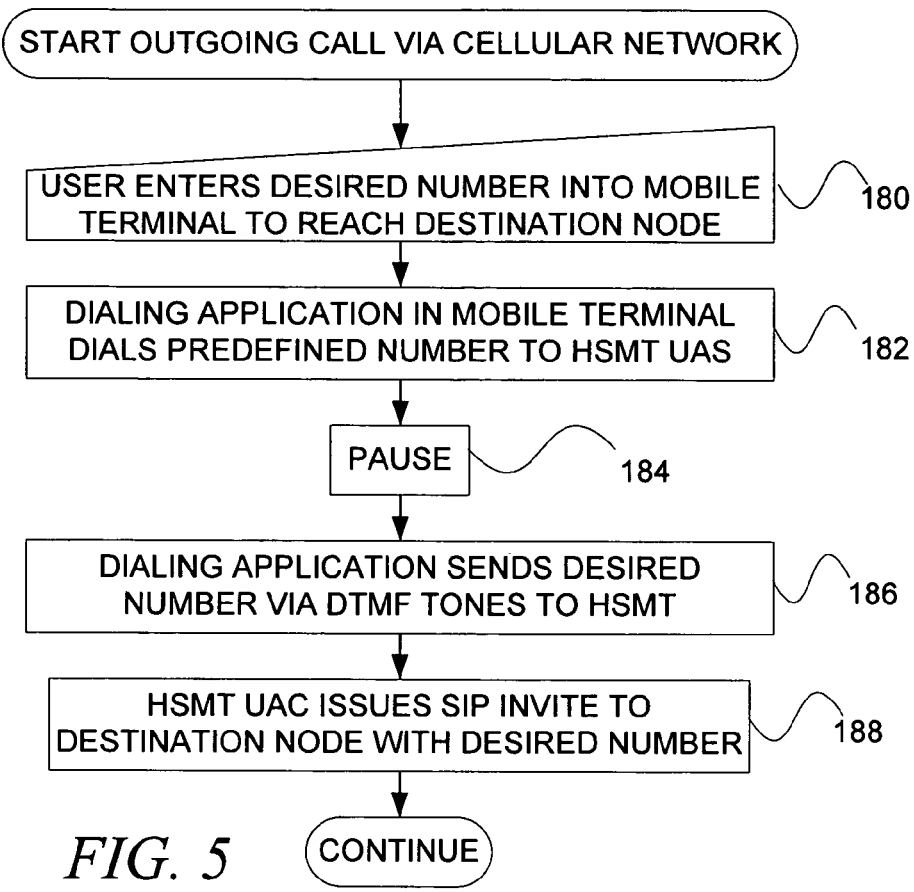
FIG. 5 is a flow diagram illustrating exemplary logic for establishing an outgoing call from the mobile terminal to a partner node via the cellular network.

FIG. 5 is a flow diagram illustrating exemplary logic for establishing an outgoing call from the mobile terminal to a partner node via the cellular network. At an operation 180, the user enters a desired number into the mobile terminal to initiate communication with a desired partner node. However, the dialing application being executed by the mobile terminal instead calls the HSMT UAS at a predefined number, as shown at an operation 182. The dialing application can be implemented as a Symbian application, Java-based application, or other suitable application. The mobile terminal can call the HSMT via the cellular network or via the WLAN if the mobile terminal is within range of a WLAN access point. However, the logic of FIG. 5 is directed to the circumstance in which the mobile terminal is out of range of a WLAN access point. The mobile terminal then pauses at an operation 184 to await connection. At step 186, the dialing application instructs the mobile terminal to send dual tone multi frequency (DTMF) signals to the HSMT via the cellular network. The HSMT interprets the DTMF tones, and issues a SIP invitation to the corresponding telephone number, establishing communication with the desired partner node, at an operation 188. The HSMT thus connects the outgoing call from the mobile terminal to the desired partner node via the cellular network.

Figure 6:
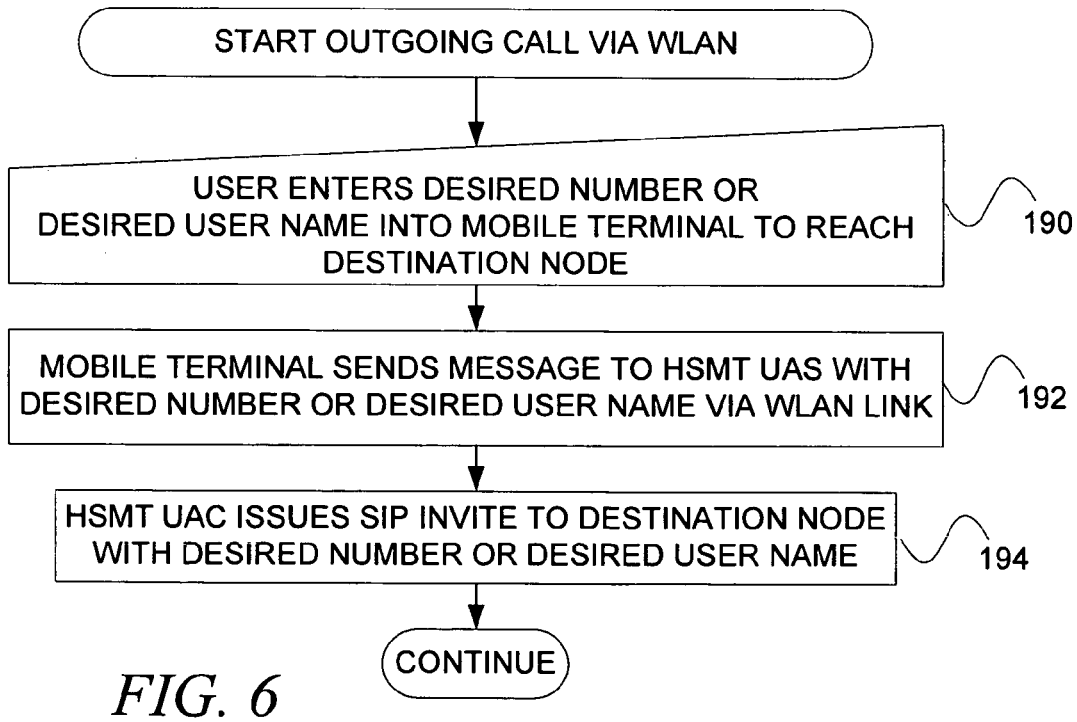
FIG. 6 is a flow diagram illustrating exemplary logic for establishing an outgoing call from the mobile terminal to a desired partner node via the WLAN.

FIG. 6 is a flow diagram illustrating exemplary logic for establishing an outgoing call from the mobile terminal to a desired partner node via the WLAN. At an operation 190, the user enters a desired telephone number or a desired user name address into the mobile terminal. The mobile terminal then sends a message over the WLAN to the HSMT UAS, at an operation 192. The message includes the desired telephone number or desired user name address. At an operation 194, the HSMT UAC issues a SIP invitation to the desired partner node, at an operation 194. Once communication is accepted by the partner node, communication is complete between the mobile terminal and the desired partner node.

Figure 7:
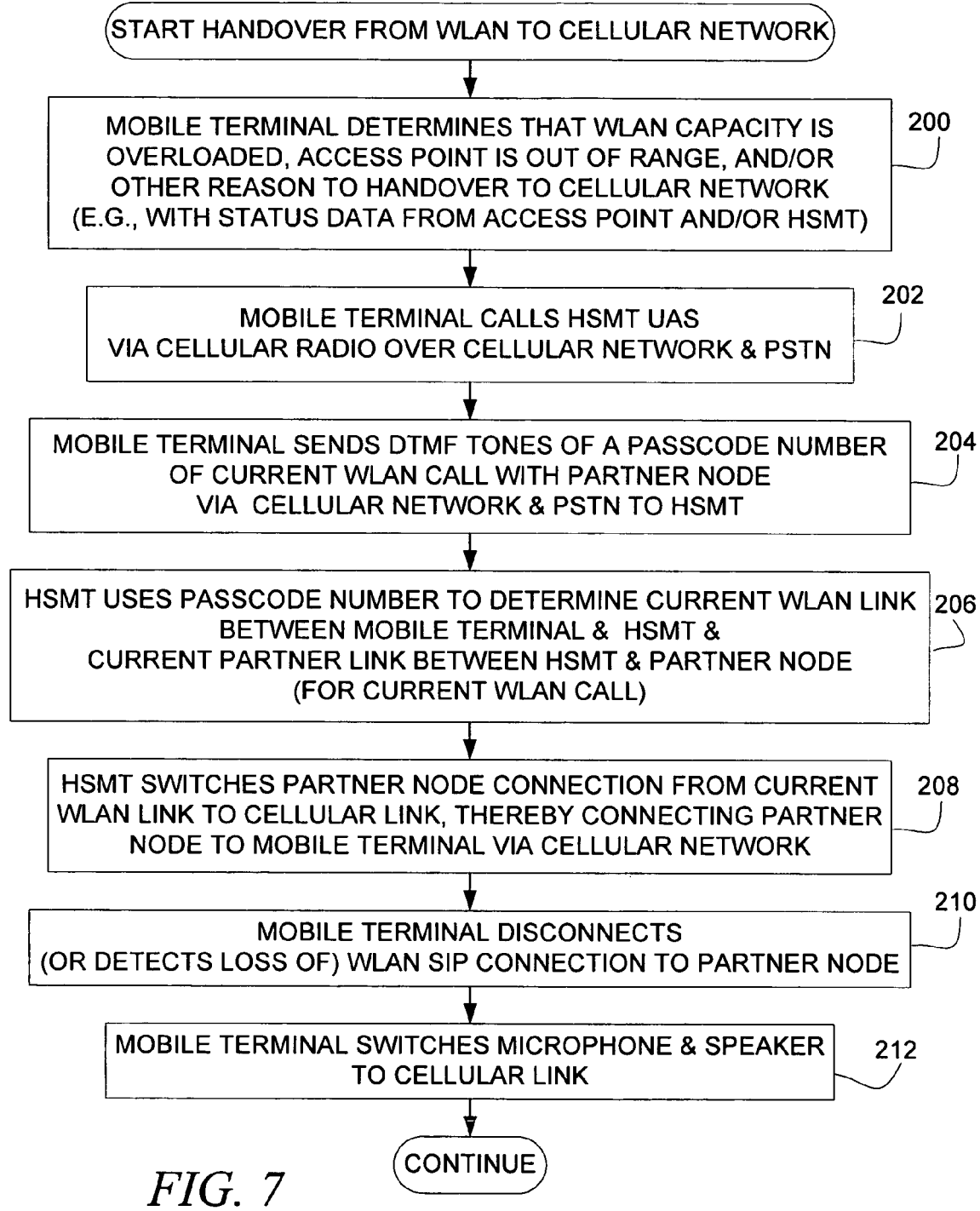
FIG. 7 is a flow diagram illustrating exemplary logic for handing over communication from the WLAN to the cellular network.

FIG. 7 is a flow diagram illustrating exemplary logic for handing over communication from the WLAN to the cellular network. At an operation 200, the handover control code of the mobile terminal determines that it is no longer desirable to route voice communication via the WLAN. For example, the handover control code may determine that the WLAN capacity is overloaded, an access point is out of range, and/or the WLAN communication link is otherwise undesirable. While the voice communication continues over the WLAN, the mobile terminal calls the HSMT UAS via the cellular network, at an operation 202. At an operation 204, the mobile terminal uses the cellular network to send DTMF tones representing a passcode number of the current WLAN call with the partner node. The HSMT uses the passcode number to identify, at an operation 206, which of a plurality of WLAN links is being used for the voice communication with the mobile terminal. At an operation 208, the HSMT switches the voice communication with the partner node from the current WLAN link to the cellular link. This switching reroutes the voice communication from the WLAN to the cellular network. At an operation 210, the mobile terminal detects a loss of communication with the WLAN or otherwise disconnects voice communication with the WLAN. The mobile terminal also switches the microphone and speaker to the cellular wireless interface, at an operation 212.

Figure 8:
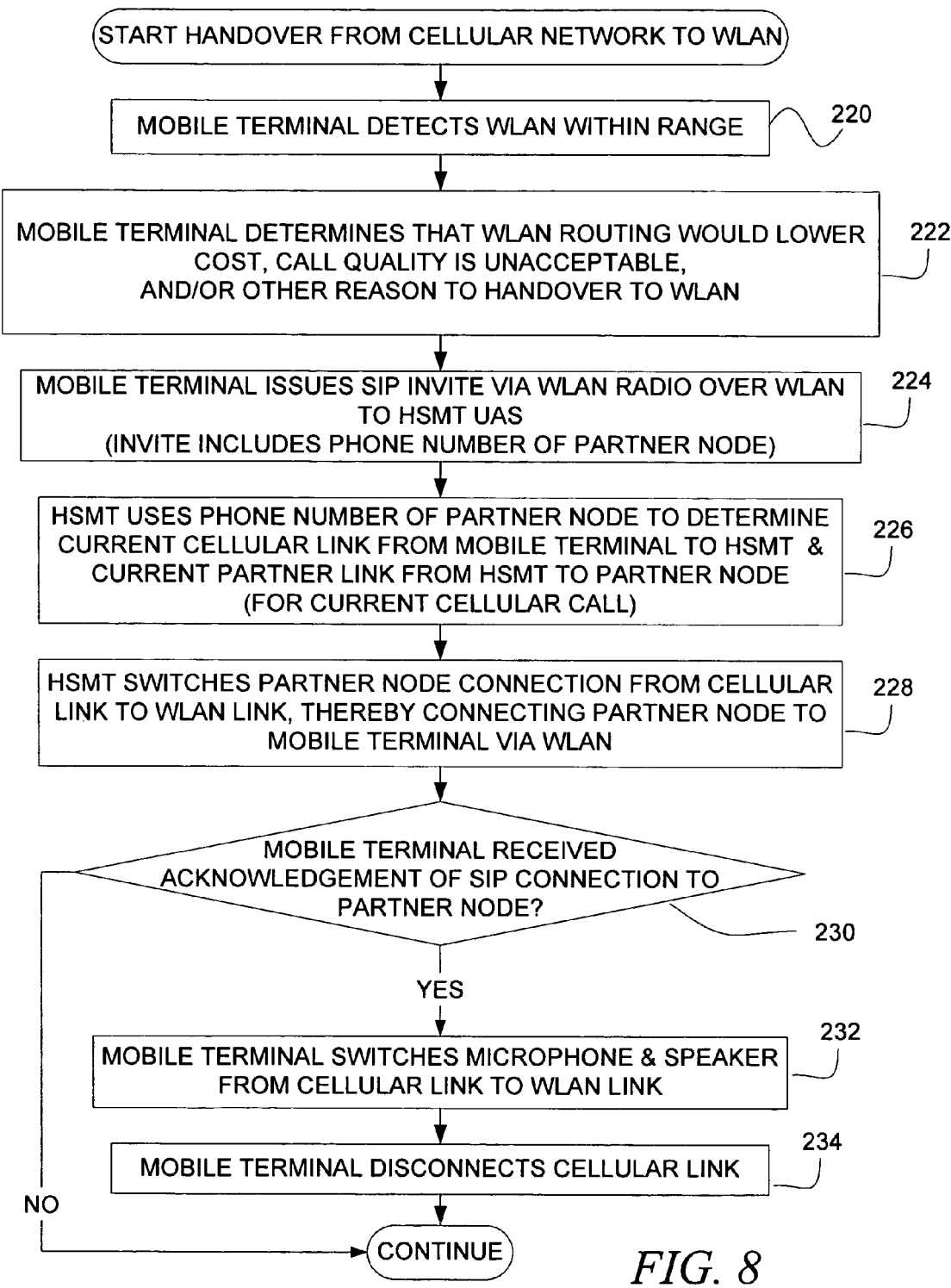
FIG. 8 is a flow diagram illustrating exemplary logic for a converse network handover from the cellular network to the WLAN.

FIG. 8 is a flow diagram illustrating exemplary logic for the converse network handover from the cellular network to the WLAN. At an operation 220, the mobile terminal detects that a WLAN access point is within range. The mobile terminal then determines, at an operation 222, that routing through the WLAN would be preferable. For example, it may be more cost effective to route the communication through the WLAN rather than through the cellular network. Alternatively, the signal strength of the cellular network may be unacceptable. Similarly, jitter, dropped packets, latency, and/or other voice codec quality characteristics may be below a desired threshold. The mobile terminal can utilize network performance statistics provided from the WLAN call manager, the HSMT, the cellular network and/or other monitoring sources.

At an operation 224, the mobile terminal issues a SIP invitation via the WLAN to the HSMT UAS. The SIP invitation includes the phone number of the partner node with which the mobile terminal is currently communicating. The HSMT uses the phone number of the partner node to determine, at an operation 226, the current cellular link between the HSMT and the mobile terminal. Similarly, the HSMT uses the phone number of the partner node to determine the current partner link between the HSMT and the partner node from a plurality of partner links between the HSMT and other nodes. At an operation 228, the HSMT switches the partner node connection from the cellular network link to the WLAN link. This switching reroutes the voice communication to the enterprise's WLAN rather than the cellular network.

At a decision operation 230, the mobile terminal determines whether it has received acknowledgement of the SIP invitation to the HSMT and corresponding connection to the partner node. If such acknowledgement is not received, the mobile terminal continues to communicate via the cellular network, and can again attempt to have the call rerouted to the WLAN. However, if the acknowledgment is received, the mobile terminal switches the microphone and speaker from the cellular network interface to the WLAN network interface, at an operation 232. At an operation 234, the mobile terminal then disconnects the cellular link.

The above specification, examples and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A method comprising:
   (a) determining that an initial communication link via an initial wireless network between a central server and a first wireless interface of a mobile terminal is undesirable, wherein the central server is in communication with a partner node, enabling a communication session between the mobile terminal and the partner node through a first secret identifier of the mobile terminal;
   (b) establishing a different communication link via a different wireless network between the central server and a second interface of the mobile terminal through a second secret identifier of the mobile terminal;
   (c) causing the communication session to be switched from the initial communication link to the different communication link thereby rerouting the communication session between the mobile terminal and the partner node, wherein the first and second secret identifiers are associated with a single public identifier of the mobile terminal.

2. The method of claim 1, wherein one of:
   (a) the initial wireless network comprises a wireless local area network (WLAN) and the different wireless network comprises a cellular network; and
   (b) the initial wireless network comprises the cellular network and the different wireless network comprises the WLAN.

3. The method of claim 1, wherein determining that the initial communication link is undesirable, is performed by the mobile terminal.

4. The method of claim 1, wherein determining that the initial communication link is undesirable comprises at least one of:
   (a) determining that network capacity is deficient;
   (b) determining that an interface point is out of range for providing communication between the mobile terminal and the central server;
   (c) determining that a cellular communication signal strength is deficient and
   (d) determining that a call quality characteristic is deficient.

5. The method of claim 1, wherein establishing a different communication link comprises at least one of:
   (a) causing the mobile terminal to use the second interface to communicate with the central server over the different wireless network; and
   (b) causing the mobile terminal to send a session-based initiation protocol message to the central server to invite the partner node to participate in the communication session via the different communication link.

6. The method of claim 1, further comprising the step of determining an identifier of the partner node from the mobile terminal.

7. The method of claim 6, wherein the identifier of the partner node comprises one of a phone number, and a uniform resource identifier.

8. The method of claim 6, wherein causing the communication session to be switched comprises:
   (a) determining a partner communication link that connects the central server to the partner node, wherein the partner communication link is initially coupled to the initial communication link; and
   (b) causing the partner communication link to be coupled to the different communication link.

9. The method of claim 1, further comprising at least one of:
   (a) switching a microphone and a speaker of the mobile terminal from the first interface to the second interface; and
   (b) disconnecting the initial communication link.

10. The method of claim 1, wherein the first secret identifier is a secret cellular phone number.

11. The method of claim 10, wherein the second secret identifier is a secret uniform resource identifier.

12. A method comprising:
    (a) intercepting an incoming call from a partner node so that the incoming call is not routed directly to a mobile terminal, the incoming call identifying the mobile terminal by a predefined public identifier;
    (b) determining, by a central server, whether the incoming call should be routed to the mobile terminal via one of a first wireless network and a second wireless network;
    (c) routing the incoming call to a first wireless interface of the mobile terminal via the first wireless network using a first secret identifier of the mobile terminal, if the first wireless network meets predefined criteria; and
    (d) otherwise routing the incoming call to a second wireless interface of the mobile terminal via the second wireless network using a second secret identifier of the mobile terminal, if the second wireless network meets the predefined criteria,
    wherein the first and second secret identifiers are associated with the predefined public identifier of the mobile terminal.

13. The method of claim 12, further comprising detecting a presence of the mobile terminal within a range of a network access point of at least one of the first wireless network and the second wireless network.

14. The method of claim 12, wherein the first secret identifier is a secret cellular phone number.

15. A method comprising:
    (a) detecting entry of a destination identifier corresponding to a destination node;
    (b) communicating the destination identifier to a central server via one of a first wireless network and a second wireless network;
    (c) causing the central server to establish communication with the destination node as a function of the destination identifier; and
    (d) causing the central server to switch the communication with the destination node to a mobile terminal via the one of the first wireless network using a first secret identifier of the mobile terminal and the second wireless network using a second secret identifier of the mobile terminal, thereby rerouting the communication session between the mobile terminal and the destination node, wherein the mobile terminal is configured to communicate with the first wireless network through a first wireless interface and with the second wireless network through a second wireless interface,
    wherein the first and second secret identifiers are associated with a single public identifier of the mobile device.

16. The method of claim 15, wherein communicating the destination identifier comprises detecting a presence of the mobile terminal within a range of an interface point of at least one of the first wireless network and the second wireless network.

17. An apparatus comprising:
- a central server comprising:
  - a processor;
  - a memory;
  - a switch; and
  - multiple ports, in conjunction with the processor, memory, and switch, configured to communicate with a mobile device via an initial wireless network and via a different wireless network, and with a partner node to enable a communication session between a partner node and the mobile device via one of the initial wireless network using a first secret identifier of the mobile device and the different wireless network using a second secret identifier of the mobile device and configured to cause the communication session to be switched from an initial communication link between the partner node and the mobile device to a different communication link between the partner node and the mobile device thereby rerouting the communication session between the mobile terminal and the partner node,
- wherein the first and second secret identifiers are associated with a single public identifier of the mobile device.

18. The method of claim 14, wherein the second secret identifier is a secret uniform resource identifier.

19. A computer readable storage medium for storing computer program instructions that when executed by a processor perform operations comprising:
(a) determining that an initial communication link via an initial wireless network between a central server and a first wireless interface of a mobile terminal is undesirable, wherein the central server is in communication with a partner node, enabling a communication session between the mobile terminal and the partner node through a first secret identifier of the mobile terminal;
(b) establishing a different communication link via a different wireless network between the central server and a second interface of the mobile terminal through a second secret identifier of the mobile terminal;
(c) causing the communication session to be switched from the initial communication link to the different communication link thereby rerouting the communication session between the mobile terminal and the partner node, wherein the first and second secret identifiers are associated with a single public identifier of the mobile terminal.

* * * * *